US011556381B2

(12) United States Patent
Dean et al.

(10) Patent No.: US 11,556,381 B2
(45) Date of Patent: Jan. 17, 2023

(54) ASYNCHRONOUS DISTRIBUTED DATA FLOW FOR MACHINE LEARNING WORKLOADS

(71) Applicant: Google LLC, Mountain View, CA (US)

(72) Inventors: Jeffrey Adgate Dean, Palo Alto, CA (US); Sudip Roy, San Jose, CA (US); Michael Acheson Isard, San Francisco, CA (US); Aakanksha Chowdhery, Mountain View, CA (US); Brennan Saeta, Kirkland, WA (US); Chandramohan Amyangot Thekkath, Palo Alto, CA (US); Daniel William Hurt, Westminster, CO (US); Hyeontaek Lim, Palo Alto, CA (US); Laurent El Shafey, Mountain View, CA (US); Parker Edward Schuh, Mountain View, CA (US); Paul Ronald Barham, San Francisco, CA (US); Ruoming Pang, New York, NY (US); Ryan Sepassi, Palo Alto, CA (US); Sanjay Ghemawat, Mountain View, CA (US); Yonghui Wu, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/738,909

(22) Filed: May 6, 2022

(65) Prior Publication Data
US 2022/0357985 A1    Nov. 10, 2022

Related U.S. Application Data

(60) Provisional application No. 63/186,031, filed on May 7, 2021.

(51) Int. Cl.
*G06F 15/82* (2006.01)
*G06F 9/48* (2006.01)
(Continued)

(52) U.S. Cl.
CPC .......... *G06F 9/4881* (2013.01); *G06N 3/063* (2013.01); *G06N 3/08* (2013.01)

(58) Field of Classification Search
CPC ......... G06F 9/4881; G06N 3/063; G06N 3/08
See application file for complete search history.

(56) References Cited

U.S. PATENT DOCUMENTS 10,719,760 B2 *   7/2020   Ma ...................... G06N 3/0445
2015/0379424 A1   12/2015  Dirac et al.
(Continued)

FOREIGN PATENT DOCUMENTS

CN    108280514 B  * 10/2020  ............. G06N 3/063
EP    3396545 A1     10/2018
(Continued)

OTHER PUBLICATIONS

Abadi et al., "TensorFlow: a system for large-scale machine learning," USENIX, 2016, 21 pages.
(Continued)

*Primary Examiner* — Cheng Yuan Tseng
(74) *Attorney, Agent, or Firm* — Fish & Richardson P.C.

(57) ABSTRACT

Methods, systems, and apparatus, including computer programs encoded on computer storage media, for distributing machine learning workloads, e.g., computations for training a neural network or computing an inference using a neural network, across multiple hardware accelerators. One of the systems comprises a plurality of accelerator islands, each hardware accelerator island comprising a respective plurality of hardware devices that include a plurality of hardware accelerators and a corresponding host for each of the plu-
(Continued)

rality of hardware accelerators; and a respective scheduler for each of the accelerator islands that is configured to schedule workloads across the plurality of accelerators and corresponding hosts in the accelerator island, wherein the system is configured to: receive data representing a machine learning workload; and assign a respective portion of the machine learning workload to each of the plurality of accelerator islands for scheduling by the respective scheduler for the accelerator island.

18 Claims, 6 Drawing Sheets

(51) Int. Cl.
*G06N 3/08* (2006.01)
*G06N 3/063* (2006.01)

(56) References Cited

U.S. PATENT DOCUMENTS

| | | | | |
|---|---|---|---|---|
| 2018/0314934 | A1* | 11/2018 | Ben-Avi | G06N 3/0454 |
| 2019/0205737 | A1* | 7/2019 | Bleiweiss | G06N 20/00 |
| 2019/0312772 | A1 | 10/2019 | Zhao et al. | |
| 2019/0324759 | A1* | 10/2019 | Yang | G06N 3/084 |
| 2020/0311521 | A1 | 10/2020 | Ghosh | |
| 2020/0380344 | A1* | 12/2020 | Lie | G06N 7/005 |
| 2021/0110236 | A1* | 4/2021 | Shibata | G06N 3/0454 |
| 2021/0124614 | A1* | 4/2021 | Gupta | G06K 9/6256 |
| 2022/0164242 | A1* | 5/2022 | Sui | G06F 9/505 |

FOREIGN PATENT DOCUMENTS

| | | | |
|---|---|---|---|
| TW | 202127249 A | * | 7/2021 |
| WO | WO-2021242388 A1 | * | 12/2021 |

OTHER PUBLICATIONS

Agrawal et al, "TensorFlow Eager: a multi-stage, Python-embedded DSL for machine learning," arXiv, 2019, 12 pages.
Akidau et al, "MillWheel: Fault-tolerant stream processing at Internet scale," Very Large Bases, 2013, 12 pages.
Angel et al, "End-to-end performance isolation through virtual datacenters," USENIX, 2014, 17 pages.
Ausavarungnirun et al, "MASK: Redesigning the GPU memory hierarchy to support multi-application concurrency," ACM, 2018, 16 pages.
Barham et al, "Machine learning systems are stuck in a rut," HotOS, 2019, 7 pages.
Baumann et al, "The multikernel: a new OS architecture for scalable multicore systems," ACM SIGOPS, 2009, 15 pages.
Blelloch, "Programming parallel algorithms," ACM, 1996, 13 pages.
Brown et al, "Language models are few-shot learners," NIPS, 2020, 25 pages.
Chen et al, "TVM: an automated end-to-end optimizing compiler for deep learning," USENIX, 2018, 17 pages.
Clarke et al., "The MPI message passing interface standard," Programming Environments for Massively Parallel Distributed Systems, 1994, 6 pages.
Crankshaw et al, "Clipper: a low-latency online prediction serving system" USENIX, 2017, 17 pages.
Culler, "Dataflow architectures" Annual Review of Computer Science, 1986, 30 pages.
developer.download.nvidia.com [online], "NVIDIA GPUDirect technology" 2012, retrieved on Feb. 2021, retrieved from URL <http://developer.download.nvidia.com/devzone/devcenter/cuda/docs/GPUDirect_Technology_Overview.pdf>, 20 pages.
Devlin et al, "BERT: Pre-training of deep bidirectional transformers for language understanding" Association for Computational Linguistics, 2019, 16 pages.
docs.ray.io [online] "Placement Groups" 2022, retrieved in 2022, retrieved from URL <https://docs.ray.io/en/master/ray-core/placement-group.html>, 7 pages.
Fedus et al, "Switch transformers: Scaling to trillion parameter models with simple and efficient sparsity" arXiv, 2021, 31 pages.
Feitelson et al., "Distributed hierarchical control for parallel processing" Computer, 1990, 13 pages.
Foley et al, "Ultra-performance Pascal GPU and NVLink interconnect" IEEE, 2017, 11 pages.
github.com [online], "Composable transformations of Python+NumPy programs: differentiate, vectorize, JIT to GPU/TPU, and more," 2018, retrieved on Oct. 11, 2022, retrieved from URL<http://github.com/google/jax>, 13 pages.
google.com [online], "Cloud TPU," May 17, 2017, retrieved on Oct. 11, 2022, retrieved from URL<https://cloud.google.com/tpu>, 8 pages.
Gupta et al, "Pegasus: Coordinated scheduling for virtualized accelerator-based systems" USENIX, 2011, 14 pages.
Gupta et al., "Shampoo: Preconditioned stochastic tensor optimization" arXiv, 2018, 21 pages.
He et al., "Deep residual learning for image recognition" CVPR, 2016, 9 pages.
Hinton et al., "Matrix capsules with EM routing" ICLR, 2018, 15 pages.
Houlsby et al, "Parameter-efficient transfer learning for NLP" ICML, 2019, 13 pages.
Huang et al, "Gpipe: Efficient training of giant neural networks using pipeline parallelism" NIPS, 2019, 10 pages.
images.nvidia.com [online], "NVIDIA NVSwitch" 2018, retrieved on Oct. 2019, retrieved from URL <https://images.nvidia.com/content/pdf/nvswitch-teclmical-overview.pdl>, 8 pages.
International Search Report and Written Opinion in International Appln. No. PCT/US2022/028177, dated Jul. 26, 2022, 16 pages.
Isard et al., "Dryad: Distributed data-parallel programs from sequential building blocks" SIGOPS, 2007, 14 pages.
Jeon et al., "Multi-tenant GPU clusters for deep learning workloads: Analysis and implications" Technical report, 2018, 14 pages.
Jia et al, "Improving the accuracy, scalability, and performance of graph neural networks with ROC" Proceedings of Machine Learning and Systems, 2020, 12 pages.
Jouppi et al, "A domain-specific supercomputer for training deep neural networks" ACM, 2020, 12 pages.
Kirk, "NVIDIA CUDA software and GPU parallel computing architecture" ISMM, 2007, 1 page.
Krizhevsky et al, "ImageNet classification with deep convolutional neural networks" NIPS, 2012, 9 pages.
Kumar et al., "Exploring the limits of concurrency in ML training on Google TPUs," arXiv, Mar. 15, 2021, 12 pages.
Kwon et al, "Nimble: Lightweight and parallel GPU task scheduling for deep learning" NIPS, 2020, 12 pages.
Lanchantin et al, "Neural message passing for multi-label classification" Springer, 2020, 17 pages.
learningsys.org [online], "Asynchronous distributed data parallelism for machine learning," Jan. 2015, retrieved on Aug. 2, 2022, retrieved from URL<http://learningsys.org/papers/LearningSys_2015_paper_14.pdf>, 5 pages.
Lepikhin et al, "Gshard: Scaling giant models with conditional computation and automatic sharding" arXiv, 2020, 35 pages.
Ma et al, "Modeling task relationships in multi-task learning with multi-gate mixture-of-experts" ACM, 2018, 10 pages.
Mahajan et al, "Themis: Fair and efficient GPU cluster scheduling" USENIX, 2020, 17 pages.
Moritz et al, "RAY: a distributed framework for emerging AI applications" USENIX, 2018, 18 pages.
Murray et al, "NAIAD: a timely dataflow system" SOSP, 2013, 17 pages.
Murray et al, "TF DATA: a machine learning data processing framework" VLDB, 2021, 16 pages.
Narayanan et al, "Efficient large-scale language model training on GPU clusters" arXiv, 2021, 13 pages.
Narayanan et al, "Heterogeneity—aware cluster scheduling policies for deep learning workloads" USENIX, 2020, 19 pages.

(56) References Cited

OTHER PUBLICATIONS

Narayanan et al, "PipeDream: Generalized pipeline parallelism for DNN training" ACM, 2019, 15 pages.
Naumov et al, "Deep learning training in Facebook data centers: Design of scale-up and scale-out systems" arXiv, 2020, 10 pages.
Pan et al., "Cyclades: Conflict-free asynchronous machine learning," arXiv, May 31, 2016, 30 pages.
Paszke et al, "Automatic differentiation in PyTorch" NIPS, 2017, 4 pages.
Paszke et al, "PyTorch: an imperative style, high-performance deep learning library" NIPS, 2019, 12 pages.
Pham et al, "Efficient neural architecture search via parameter sharing" arXiv, 2018, 11 pages.
Radul et al, "Automatically batching control-intensive programs for modern accelerators" Proceedings of Machine Learning and Systems, 2020, 10 pages.
Raffel et al, "Exploring the limits of transfer learning with a unified text-to-text transformer" arXiv, 2019, 53 pages.
Rajbhandari et al, "ZeRO-Infinity: Breaking the GPU memory wall for extreme scale deep learning" arXiv, 2021, 14 pages.
Rasley et al, "DeepSpeed: System optimizations enable training deep learning models with over 100 billion parameters" ACM, 2020, 2 pages.
Ren et al, "Hopper: Decentralized speculation-aware cluster scheduling at scale" ACM, 2015, 14 pages.
Rhu et al, "vDNN: Virtualized deep neural networks for scalable, memory-efficient neural network design" arXiv, 2016, 13 pages.
Shahrad et al, "Availability knob: Flexible user-defined availability in the cloud" ACM, 2016, 15 pages.
Shallue et al, "Measuring the effects of data parallelism on neural network training" arXiv, 2018, 49 pages.
Shazeer et al, "Mesh-TensorFlow: Deep learning for supercomputers" NIPS, 2018, 10 pages.
Shazeer et al, "Outrageously large neural networks: the sparsely-gated mixture-of-experts layer" ICLR, 2017, 19 pages.
Shoeybi et al, "Megataon-LM: Training multi-billion parameter language models using model parallelism" arXiv, 2019, 15 pages.
tensorflow.org [online], "TensorFlow Datasets: a collection of ready-to-use datasets," Feb. 22, 2019, retrieved on Oct. 11, 2022, retrieved from URL<https://www.tensorflow.org/datasets>, 2 pages.
tensorflow.org [online], "XLA: Optimizing compiler for TensorFlow" 2017, retrieved in 2019, retrieved from URL <https://www.tensorflow.org/xla>, 8 pages.
Vijaykumar et al, "Zorua: a holistic approach to resource virtualization in GPUs" IEEE, 2016, 14 pages.
Wang et al, "Wavelet: Efficient DNN training with Tick-Tock scheduling" Proceedings of Machine Learning and Systems, 2021, 15 pages.
Wentzlaff et al, "An operating system for multicore and clouds: Mechanisms and implementation" ACM, 2010, 12 pages.
Xiao et al, "Gandiva: Introspective cluster scheduling for deep learning" USENIX, 2018, 17 pages.
Yang et al, "Pipemare: Asynchronous pipeline parallel DNN training" Proceedings of Machine Learning and Systems, 2021, 28 pages.
You et al, "Large batch training of convolutional networks" arXiv, 2017, 8 pages.
Yu et al, "AvA: Accelerated virtualization of accelerators" Proceedings of the Twenty-Fifth International Conference on Architectural Support for Programming Languages and Operating Systems, 2020, 19 pages.
Yu et al, "Dynamic control flow in large-scale machine learning" Proceedings of EuroSys, 2018, 15 pages.
Yu et al, "Salus: Fine-grained GPU sharing primitives for deep learning applications" Proceedings of Machine Learning and Systems, 2020, 14 pages.
Zaharia et al, "Spark: Cluster computing with working sets" USENIX, 2010, 7 pages.
Zhang et al, "Share of not? Learning to schedule language-specific capacity for multilingual translation" ICLR, 2021, 19 pages.
Zhao et al, "Recommending what video to watch next: a multi-task ranking system" ACM, 2019, 9 pages.

* cited by examiner (b) Parallel dispatch (a) Sequential dispatch

ASYNCHRONOUS DISTRIBUTED DATA FLOW FOR MACHINE LEARNING WORKLOADS

CROSS-REFERENCE TO RELATED APPLICATION

This application claims priority to U.S. Provisional Application No. 63/186,031, filed on May 7, 2021. The disclosure of the prior application is considered part of and is incorporated by reference in the disclosure of this application.

BACKGROUND

This specification relates to techniques for distributing machine learning workloads, e.g., computations for training a neural network or computing an inference using a neural network, across multiple hardware accelerators.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of weights. The input to a given neural network layer is referred to in this specification as the "input activations" for the layer and the output of the given neural network layer is referred to in this specification as the output activations for the layer.

SUMMARY

This specification describes a system implemented as computer programs on one or more computers in one or more locations that distributes a machine learning workload across multiple hardware accelerators and their corresponding hosts.

Hardware accelerators (or "accelerators" for short) are computing devices having specialized hardware configured to perform specialized computations including, e.g., machine learning computations. Examples of accelerators include graphics processing units ("GPUs"), field-programmable gate arrays ("FGPAs"), and application-specific integrated circuits ("ASICs"), including tensor processing units ("TPUs"). In some implementations, each accelerator has a distinct host while in other implementations, two or more of the accelerators can share a host.

In particular, the system maintains data partitioning hardware accelerators and their corresponding hosts into a plurality of accelerator islands. Each accelerator island includes a plurality of accelerators and their corresponding hosts. In some implementations, all of the accelerators are the same type of accelerator while in other cases different islands can include different types of accelerators or a single island can include multiple different types of accelerators. In some implementations, the partitioning is static while, in other implementations, the system dynamically adjusts the partitioning based on the current system workload.

Each accelerator island runs a respective scheduler that schedules the computations assigned to the island across the accelerators and hosts in the island. When the computations assigned to a given island are regular, the scheduler for the island can schedule the computation using parallel asynchronous dispatch.

In some implementations, the respective scheduler for each island is a single scheduler that directly schedules each operation on a given device. In other implementations, the respective scheduler is a collective of schedulers that implement a hierarchical scheduling scheme.

Particular embodiments of the subject matter described in this specification can be implemented so as to realize one or more of the following advantages.

Using the techniques described in this specification to orchestrate distributed computation across multiple hardware accelerators for supporting machine learning workloads, such as training or executing a machine learning model, can improve hardware utilization, model throughput, or both. In some examples, using the described techniques can achieve performance parity (i.e., close to 100% hardware utilization) with state-of-the-art systems when running "single program multiple data" (SPMD) computations over a large number, possibly several thousands, of hardware accelerators, while also delivering model throughput, e.g., in terms of the total number (or size) of outputs that can be generated by the model over a given time period, comparable to the SPMD case for machine learning models that are pipelined across multiple stages, or sharded across two or more islands of accelerators connected over a data center network. This enables the training, execution, or both of different machine learning models with a greater variety of architectures while being highly efficient, including large-scale models that have been scaled up using data parallelism, pipelining, or heterogeneous computation and that are not well supported by current hardware systems.

The described techniques for orchestrating distributed computation across multiple hardware accelerators enable a variety of technological use cases that were previously not possible. For example, instead of training one machine learning model from scratch for each single new machine learning task, the described techniques make it possible to train a single, large-scale model across thousands or millions of tasks, allowing the model to draw upon and combine its existing capabilities to learn new tasks faster and more effectively.

As another example, by dynamically mapping sub-parts of the overall computation to a collection of more readily available smaller islands of accelerators, the described techniques have the flexibility to support the execution of multimodal machine learning models that can process more than one modality of information at a time, e.g., a model that is configured to receive vision, auditory, language data, and possibly other data in more abstract forms simultaneously to compute an inference in a less biased and less error-prone way by utilizing the inherent common characteristics of the received data.

As yet another example, by using sparse cross-host communication to facilitate efficient data-dependent control flow on the accelerators, the described techniques can facilitate execution of sparse machine learning models in an energy-efficient manner. For example, a sparse model can be a neural network that is "sparsely" activated, where only small routes through relevant parts of the network are called into action as needed when performing different tasks. The execution of a sparse model can allow for far less energy consumption, sometimes less than $\frac{1}{10}^{th}$ the energy, compared with similarly sized dense models—while achieving or even exceeding the state-of-the-art performance on a range of machine learning tasks.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that distributes a machine learning workload across multiple hardware accelerators and their corresponding hosts.

Figure 1:
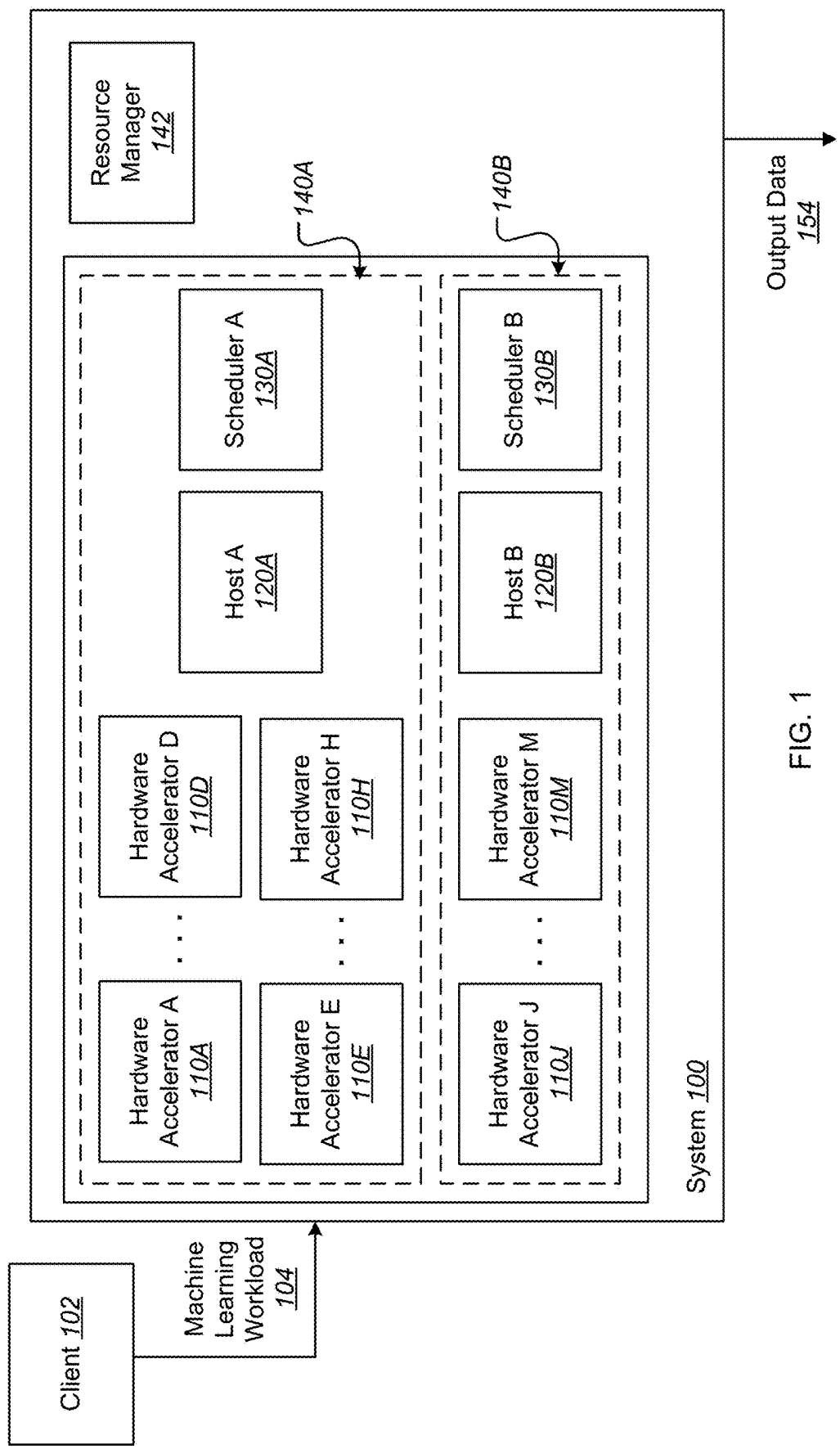
FIG. 1 illustrates an example system for executing a machine learning workload.

FIG. 1 illustrates an example system 100 for executing a machine learning workload 104. The machine learning workload 104 can be specified by a client 102. The system 100 can receive data specifying the machine learning workload 104 from the client 102, and generate output data 154 as a result of the execution of the machine learning workload 104. In some implementations, the data specifying the machine learning workload 104 may include source programs written in Python programming language by using appropriate Python programming frameworks such as TensorFlow and JAX, while in other implementations, the data may alternatively include source programs written in another high-level programming language, such as C++ language. In some implementations, the machine learning workload may include computations for training a neural network or computing an inference using a neural network. In some of these implementations, the neural network may be a large-scale neural network. A large-scale neural network is a neural network with many network parameters, e.g., 1 billion parameters, 10 billion parameters, 100 billion parameters, or 500 billion or more parameters.

The neural network can generally be configured, i.e., through training, to perform a machine learning task on a network input to generate network output for the machine learning task.

Some examples of machine learning tasks that the neural network can be configured to perform follow.

As one example, the task may be a neural machine translation task. For example, if the input to the neural network is a sequence of text, e.g., a sequence of words, phrases, characters, or word pieces, in one language, the output generated by the neural network may be a translation of the sequence of text into another language, i.e., a sequence of text in the other language that is a translation of the input sequence of text. As a particular example, the task may be a multi-lingual machine translation task, where a single neural network is configured to translate between multiple different source language—target language pairs. In this example, the source language text may be augmented with an identifier that indicates the target language into which the neural network should translate the source language text.

As another example, the task may be an audio processing task. For example, if the input to the neural network is a sequence representing a spoken utterance, the output generated by the neural network may be a score for each of a set of pieces of text, each score representing an estimated likelihood that the piece of text is the correct transcript for the utterance. As another example, if the input to the neural network is a sequence representing a spoken utterance, the output generated by the neural network can indicate whether a particular word or phrase ("hotword") was spoken in the utterance. As another example, if the input to the neural network is a sequence representing a spoken utterance, the output generated by the neural network can identify the natural language in which the utterance was spoken.

As another example, the task can be a natural language processing or understanding task, e.g., an entailment task, a paraphrase task, a textual similarity task, a sentiment task, a sentence completion task, a grammaticality task, and so on, that operates on a sequence of text in some natural language.

As another example, the task can be a text to speech task, where the input is text in a natural language or features of text in a natural language and the network output is a spectrogram, a waveform, or other data defining audio of the text being spoken in the natural language.

As another example, the task can be a health prediction task, where the input is a sequence derived from electronic health record data for a patient and the output is a prediction that is relevant to the future health of the patient, e.g., a predicted treatment that should be prescribed to the patient, the likelihood that an adverse health event will occur to the patient, or a predicted diagnosis for the patient.

As another example, the task can be a text generation task, where the input is a sequence of text, and the output is another sequence of text, e.g., a completion of the input sequence of text, a response to a question posed in the input sequence, or a sequence of text that is about a topic specified by the first sequence of text. As another example, the input to the text generation task can be an input other than text, e.g., an image, and the output sequence can be text that describes the input.

As another example, the task can be an image generation task, where the input is a conditioning input and the output is a sequence of intensity value inputs for the pixels of an image.

As another example, the task can be an agent control task, where the input is a sequence of observations or other data characterizing states of an environment and the output defines an action to be performed by the agent in response to the most recent data in the sequence. The agent can be, e.g., a real-world or simulated robot, a control system for an industrial facility, or a control system that controls a different kind of agent.

As another example, the task can be a genomics task, where the input is a sequence representing a fragment of a DNA sequence or other molecule sequence and the output is either an embedding of the fragment for use in a downstream task, e.g., by making use of an unsupervised learning technique on a data set of DNA sequence fragments, or an output for the downstream task. Examples of downstream tasks include promoter site prediction, methylation analysis, predicting functional effects of non-coding variants, and so on.

In some cases, the machine learning task is a combination of multiple individual machine learning tasks, i.e., the system is configured to perform multiple different individual machine learning tasks, e.g., two or more of the machine learning tasks mentioned above. For example, the system can be configured to perform multiple individual natural language understanding tasks, with the network input including an identifier for the individual natural language understanding task to be performed on the network input.

In the implementations where the system 100 executes the machine learning workload 104 for training a neural network, the system 100 can receive architecture data defining an architecture of the neural network. The architecture defines the number of layers in the neural network, the operations performed by each of the layers, and the connectivity between the layers in the neural network, i.e., which layers receive inputs from which other layers in the neural network.

The system 100 can also receive training data for training the neural network to perform one or more of the machine learning tasks mentioned above. Generally, the training data includes a set of neural network inputs and, for each network input, a respective target output that should be generated by the neural network to perform the particular task. In some implementations, a larger set of training data may be randomly partitioned by the system to generate the training data and a validation set for evaluating the performance of the neural network on the tasks.

The system 100 can receive the architecture data and training data in any of a variety of ways. For example, the system 100 can receive the architecture data as an upload from the client 102 over the data communication network, e.g., using an application programming interface (API) made available by the system 100. As another example, the system 100 can receive an input from the client 102 specifying which data that is already maintained by the system 100, or another cloud storage system that is accessible by the system, should be used for training the neural network.

Once the system 100 trains the neural network through the execution of machine learning workload 104, the system can provide data specifying the trained neural network for use in processing new network inputs. That is, the system can output the trained values of the network parameters to the client 102 for later use in processing inputs using the trained neural network, e.g., by outputting to a user device or by storing in a memory accessible to the system.

Alternatively or in addition to outputting the trained neural network data, the system 100 can instantiate an instance of the neural network having the trained values of the network parameters, and receive inputs to be processed and use the trained neural network to process the received inputs to generate outputs and then provide the generated outputs in respect to the received inputs. The system can receive network inputs through an application programming interface ("API") offered by the system. The trained neural network can be used to process any of a variety of machine learning tasks described above.

The system 100 is typically hosted within a data center, which can be a distributed, cloud-based computing system having hundreds or thousands of hardware accelerators, e.g., hardware accelerator A 110A-hardware accelerator M 110M, in one or more locations. Hardware accelerators (or "accelerators" for short) are computing devices having specialized hardware configured to perform specialized computations including, e.g., machine learning computations. Examples of accelerators include graphics processing units ("GPUs"), field-programmable gate arrays ("FGPAs"), and application-specific integrated circuits ("ASICs"), including tensor processing units ("TPUs").

Because the hardware accelerators can only efficiently perform a subset of operations, e.g., matrix multiplication, for which their hardware is optimized, the hardware accelerators are connected to host machines, e.g., host A 120A and host B 120B, which may be CPU-based host machines, to perform operations that cannot be executed on the hardware accelerators efficiently. The host machines (or "hosts" for short) are responsible for operations including loading data from cloud storage, preprocessing data, sending data to the hardware accelerators, and the like. In some implementations, each accelerator has a distinct host while in other implementations, two or more of the accelerators can share a host.

Each host manages an object store which can store the inputs and outputs of computation performed on the corresponding hardware accelerator(s). The object store can also track the buffers held in memories of the hardware accelerators. For example the client can use opaque handles to reference objects in a remote host or accelerator memory that allows the system to migrate objects if needed. The object store can also store intermediate program values, for example while the system is waiting to transfer them between accelerators, or pass them to a subsequent computation.

Each host instantiates an executor which can dispatch, i.e., schedule the execution of, the respective portions of the machine learning workload 104 across the hardware accelerators. The executions are scheduled in parallel when possible, for example by using multiple CPU cores or GPU streams. For example, the executor can be a CPU-based TensorFlow executor that facilitates serialization of input processing into a dataflow graph that represents the machine learning workload.

While FIG. 1 illustrates one client 102, the system 100 can execute the computation on behalf of many clients. In other words, the system 100 can receive respective data specifying different machine learning workloads from two or more clients, execute the different workloads with at least some degree of concurrency, and generate respective output data as a result of the execution of the different machine learning workloads. Each client can be physically adjacent to the system 100, e.g., located within a same data center as (some parts of) the system 100, or can alternatively be a cloud client that is remote from the system 100. In the latter case, the system 100 can be at least partially controlled by the cloud client. Each client can run, for example, on a desktop computer, a laptop computer, a tablet computer, a wearable computer, a cellular phone, a smart phone, a music player, an e-book reader, a navigation system, or any other appropriate computing device. Each client can communicate with the system 100 over a data communication network.

To submit a machine learning workload 104 to be executed by the system 100, the client 102 can first call a client library of the system which first assigns virtual resources to any computations defined in the workload 104 that have not been previously executed, and registers the computations with the resource manager 142 of the system, triggering the system to compile the computations in the background. The client 102 can then construct an intermediate representation (IR) for the workload, which may be a hardware accelerator location-agnostic IR expressed as a custom multi-level intermediate representation (MLIR) dialect. The IR is progressively "lowered" via a series of standard compiler passes, which eventually output a low-level representation that includes the physical hardware accelerator locations. This low-level representation takes into account the network connectivity between physical hardware accelerators and includes operations to transfer outputs from a source computation shard to the locations of its destination computation shard(s), including scatter and gather operations when a data exchange is required. This low-level representation is then converted into a sharded dataflow program, which may be represented as a dataflow graph.

Table 1 below is an example of Python code that can be submitted by the client 102 to the system 100 to run the constituent computation shards for a machine learning workload across multiple islands of hardware accelerators.

TABLE 1

```
def get_devices(n):
    """Allocates 'n' virtual TPU devices on an island."""
    device_set = pw.make_virtual_device_set()
    return device_set.add_slice(tpu_devices=n).tpus
a = jax.pmap(lambda x: x * 2., devices=get_devices(2))
b = jax.pmap(lambda x: x + 1., devices=get_devices(2))
c = jax.pmap(lambda x: x / 2., devices=get_devices(2))
@pw.program # Program tracing (optional)
def f(v):
    x = a (v)
    y = b (x)
    z = a (c (x))
    return (y, z)
print(f(numpy.array([1. , 2.])))
# output: (array([3., 5.]), array([2., 4.]))
```

In this example Python code, the client requests virtual resources, namely one or more sets of "virtual TPU devices," and then places specific compiled functions on those resources. When requesting virtual resources, the client can optionally specify the constraints on the resource types, locations, or interconnect topology. The system will automatically handle all data movement and resharding between dependent computations.

By using JAX library the client can explicitly wrap standard Python code with decorators to indicate fragments that should be compiled into Accelerated Linear Algebra (XLA) computations, which potentially follow a SPMD model. These XLA computations are usually characterized by known input and output types and shapes, bounded loops, and with conditionals (if any), making it feasible to estimate the resource requirements of computations in advance. These computations with known resource requirements as referred to herein as "compiled functions."

For example, the compiled functions can include addition or multiplication computations, operations performed by certain types of neural network layers, and the like. As another example, common types of computation that might each be a single complied function within a machine learning training workload can include, e.g., a forward and/or backward pass of a training step to compute the gradients, a function to accumulate the gradients computed across multiple distributed training steps, and the like.

By default, the system 100 converts each compiled function into a standalone program that includes just one computation shard, meaning that if a client wants to run multiple functions back to back, a separate Python call and a remote procedure call from client to coordinator is required for each function. The system therefore also implements a program tracer that the client can wrap around a block of Python code that calls multiple compiled functions. The program tracer can generate a single program where each compiled function is represented by a computation node in a dataflow graph that represents a sharded dataflow program.

Unlike existing clients which may quickly become a performance bottleneck as they coordinate thousands of individual computations and data buffers corresponding to each shard of computations spread across a large number of hardware accelerators, the client 102 of the system 100 uses a sharded buffer abstraction to represent a logical buffer that may be distributed over multiple hardware accelerators. This abstraction helps the client scale by amortizing the cost of bookkeeping tasks (including reference counting) at the granularity of logical buffers instead of individual computation shards.

Typically, existing distributed computing systems for executing machine learning workloads adopt either a single-controller architecture (e.g., a TensorFlow v1 system, described in more detail at Abadi, M., et al., TensorFlow: A system for large-scale machine learning. In 12th USENIX Symposium on Operating Systems Design and Implementation (OSDI), Savannah, Ga., November 2016. USENIX Association), or a multi-controller architecture (e.g., a PyTorch system, described in more detail at Paszke, A., et al., PyTorch: An imperative style, high-performance deep learning library. In Advances in Neural Information Processing Systems, volume 32. Curran Associates, Inc., 2019; or a JAX system, described in more detail at Bradbury, J., et al., JAX: Composable transformations of Python+NumPy programs. http://github.com/google/jax, 2018).

Figure 2:
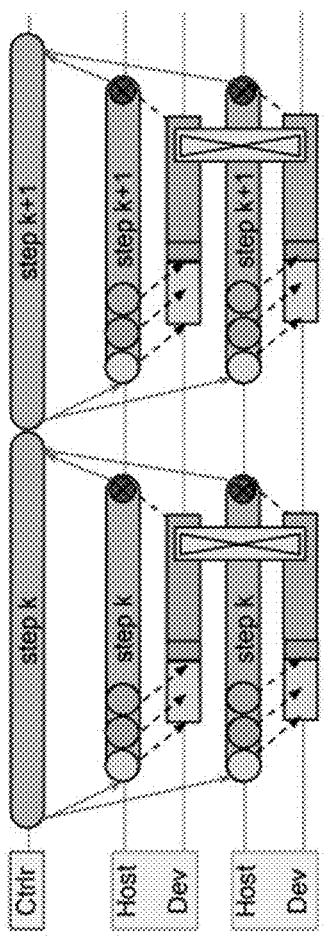
FIG. 2 illustrates a comparison of dispatch overheads and communication patterns between multi-controller and single-controller systems.
Figure 2:
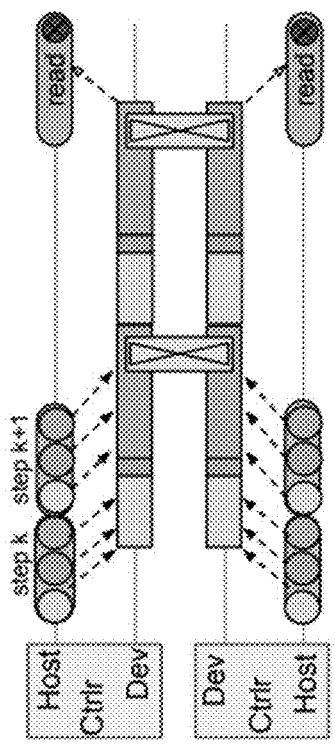
Figure 2:
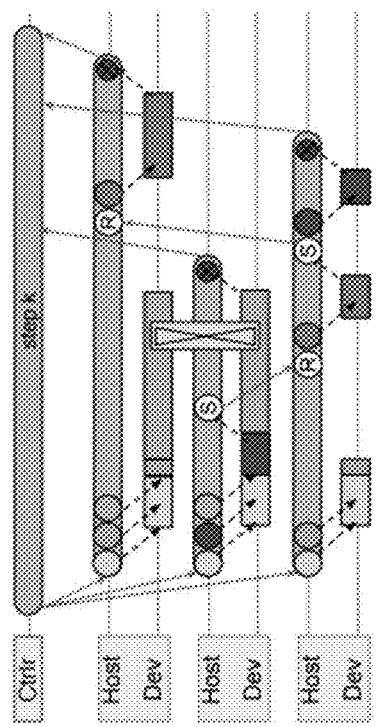
Figure 2:
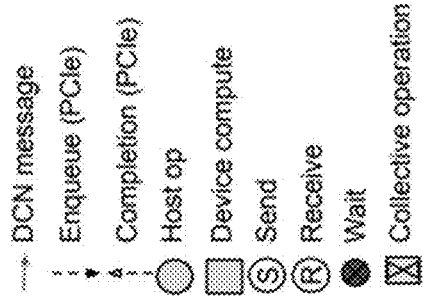

FIG. 2 illustrates a comparison of dispatch overheads and communication patterns between multi-controller and single-controller systems. Specifically, FIG. 2 includes swimlane diagrams showing actions that may be taken by a host ("Host"), a controller ("Ctrlr"), or a hardware accelerator ("Dev"). As illustrated in FIG. 2(a), JAX or PyTorch SPMD independently enqueues accelerator computations asynchronously over a fast Peripheral Component Interconnect express (PCIe) network; (b) TensorFlow v1 SPMD requires control messages over a slower data center network (DCN); (c) TensorFlow v1 non-SPMD programs require cross-host coordination or data transfer through explicit send (S) and receive (R) operations (op).

As used herein, the term "SPMD" refers to a "single program multiple data" (SPMD) model, described in more detail at Clarke, L., et al., The MPI message passing interface standard. In Programming Environments for Massively Parallel Distributed Systems, 1994, where all accelerators execute the same program (e.g., the same computation) in lockstep. On the other hand, "MPMD" refers to a "multiple programs multiple data" (MPMD) model, where multiple accelerators simultaneously execute at least two independent programs (e.g., two different computations).

Some single-controller systems offer a very general distributed dataflow model, including optimized in-graph control flow. In single-controller systems, a client, e.g., a TensorFlow (TF) Python client, can build a computation graph and hand it off to a coordinator runtime, which partitions the graph into one respective subgraph for each worker and delegates the execution of the subgraphs to local runtimes on workers. Coordination between workers is performed using data- and control-edges passing messages over the data center network (DCN). While the single-controller framework offers a flexible programming model and virtualization of resources, it presents implementation challenges, as discussed below. Firstly, clients in single-controller systems are "farther away" and the dispatch latency involves communication over DCN, typically an order of magnitude slower than PCIe (see, e.g., FIG. 2b). Secondly, to support concurrent execution of multiple program multiple data (MPMD) programs with SPMD sub-computations, each spanning a subset of accelerators selected from from a shared cluster, the runtime must have some mechanism to support gang-scheduling of accelerator computations. Gang-scheduling is essential, since some hardware accelerators such as TPUs are single-threaded and only run non-preemptible kernels, so the system will deadlock if communicating computations are not enqueued in a consistent order. Single-controller systems for executing machine learning workloads therefore require a distributed scheduling mechanism to order the computations enqueued on behalf of different programs. Finally, a system for modern machine learning workloads must be designed to run computations distributed over thousands of accelerators, with first class support for sharded representations and data structures. For instance, a naive dataflow graph representing an edge between an M-way sharded computation and an N-way sharded computation would require M+N nodes and M×N edges, rapidly becoming unwieldy.

By contrast, in multi-controller systems, the same client executable is run directly on all the hosts in the system, taking exclusive ownership of the resources on those hosts for the duration of the program execution. One advantage of the multi-controller architecture is the low latency for dispatching accelerator computations (see, e.g., FIG. 2a) since an identical copy of the client code runs on each of the accelerator hosts and dispatch involves communication only over relatively faster PCIe networks. All other communication across hosts only happens through collectives that use dedicated interconnect networks like NVLink and Inter-Core Interconnect (ICI) without going via host memory. However, the multi-controller architecture is a poor match for modern machine learning workloads that use pipelining or computational sparsity or both. Any communication beyond standard collectives in multi-controller systems requires users to implement their own coordination primitives. The multi-controller approach also typically assumes exclusive ownership of hardware resources. This not only shifts the responsibility of ensuring high utilization of the expensive accelerators on to the user, but also complicates the design of features like resource virtualization and multiplexing that are needed to build efficient cluster-wide machine learning infrastructure.

At a high level, the system 100 as described in this specification adopts a single-controller framework that combines the flexibility of single-controller systems with the performance of multi-controller systems. The architecture of the system 100 differs from existing single-controller systems in that the system 100 uses asynchronous dispatch to match the performance of multi-controller systems, supports centralized resource management and scheduling with first-class support for gangs of SPMD accelerator computations, and uses a sharded dataflow system for efficient coordination. In addition to matching the functionality and performance of state-of-the-art systems, the architecture of the system 100 also provides the capabilities needed to support a wider range of machine learning workloads, including the capability to support the training or execution of machine learning models that are large, sparse, and/or irregular.

In particular, the system 100 uses a resource manager 142 to maintain, i.e., generate or update, data that specifies the partitioning of the hardware accelerators and their corresponding hosts into a plurality of accelerator islands. The resource manager 142 is responsible for the centralized management of the devices, including the hardware accelerators, hosts, and schedulers, across all of the islands. The resource manager 142 can track all available devices of the system 100, and thus allowing underlying compute resources to be added and removed dynamically to the system. The resource manager 142 can also maintain a mapping database that defines a one-to-one mapping of virtual resources that may be requested by the client 102 to an actual, physical device of the system 100. For example, the client 102 may ask for a virtual set of hardware accelerators with specific 2D or 3D mesh shapes that suit its specific communication and/or computation needs for the machine learning workload 104, and in response, the resource manager 142 can dynamically assign physical hardware accelerators for requested virtual resources satisfying the specific interconnect topology and/or memory capacity.

In some implementations, the resource manager 142 can adopt a simple heuristic algorithm that attempts to statically balance load by spreading computations across all available devices. In other implementations, the resource manager 142 can adopt a more sophisticated allocation algorithm, for example taking into account the resource requirements of all client computations and the current state of the system to approximate an optimal allocation of physical devices to computations.

In some implementations, all of the accelerators in the system 100 are the same type of accelerator while in other implementations different islands can include different types of accelerators or a single island can include multiple different types of accelerators. In some implementations, the partitioning is static while, in other implementations, the resource manager 142 dynamically adjusts the partitioning based on the current system workload.

Each accelerator island includes a plurality of accelerators and their corresponding hosts. For example, as illustrated in FIG. 1, the system 100 maintains data partitioning hardware accelerators and their corresponding hosts into two accelerator islands 140A-B, where the accelerator island 140A includes hardware accelerator A 110A-hardware accelerator H 110H and host A 120A, while the accelerator island 140B includes hardware accelerator J 110J-hardware accelerator M 110M and host B 120B.

The hardware accelerators within each island are interconnected with one another over an interconnect network, and are connected to the hardware accelerators within another island over a data center network through their corresponding hosts. For example, the interconnect network can be an Inter-Core Interconnect (ICI) network, while the data center network (DCN) can be an Ethernet network. An extensible, general-purpose, dataflow engine can be used by the system 100 to manage the DCN communication between the accelerator islands. The dataflow engine can also be used for background housekeeping tasks that include configuration information distribution, program monitoring, error delivery, and the like.

Each accelerator island runs a respective scheduler, e.g., scheduler A 130A for island 140A and scheduler B 130B for island B 140B, that schedules the computations assigned to the island across the accelerators and hosts in the island. Each scheduler can be configured to receive a portion of the machine learning workload and assign operations to the hardware accelerators that are included in the same accelerator island as the scheduler. When the computations assigned to a given island are regular, the scheduler for the island schedules the computation using parallel asynchronous dispatch.

In some implementations, the respective scheduler for each island is a single scheduler that directly schedules each operation on a given device. In other implementations, the respective scheduler is a collective of schedulers that implement a hierarchical scheduling scheme.

The schedule is configured to schedule the computations assigned to the island across the accelerators and hosts in the island within strict timing requirements, e.g., at a timescale of milliseconds, in order to achieve normal operation of the system. In some implementations, the scheduler can simply enqueue the executions of the portions of the machine learning workload 104 in first-in, first-out (FIFO) order, while in some other implementations, the scheduler can adopt a more sophisticated scheduling algorithm, for example reordering computations based on estimated execution times.

Figure 3:
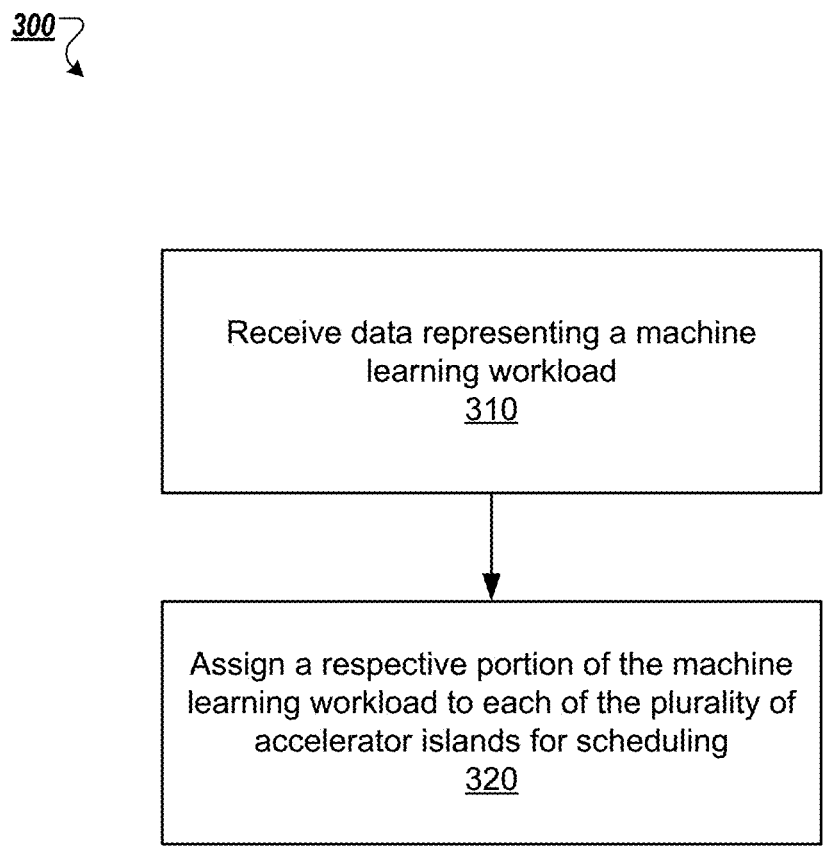
FIG. 3 is a flow diagram of an example process for executing a machine learning workload.

FIG. 3 is a flow diagram of an example process 300 for executing a machine learning workload. For convenience, the process 300 will be described as being performed by a system of one or more computers located in one or more locations. For example, a distributed computing system, e.g., the system 100 of FIG. 1, appropriately programmed in accordance with this specification, can perform the process 300.

The system maintains data partitioning hardware accelerators and their corresponding hosts into a plurality of accelerator islands. Each accelerator island includes a plurality of accelerators and their corresponding hosts. In some implementations, all of the accelerators are the same type of accelerator while in other implementations different islands can include different types of accelerators or a single island can include multiple different types of accelerators. In some implementations, the partitioning is static while, in other implementations, the system dynamically adjusts the partitioning based on the current system workload.

The system receives data representing a machine learning workload (step 302). In some cases, the system can receive the data from a client over a data communication network. In some cases, the machine learning workload includes computations for training a neural network, and the data representing the machine learning workload includes data representing a sharded dataflow program that includes a plurality of computation shards. The machine learning workload can include multiple portions that each correspond to a respective compiled function.

Figure 4B:
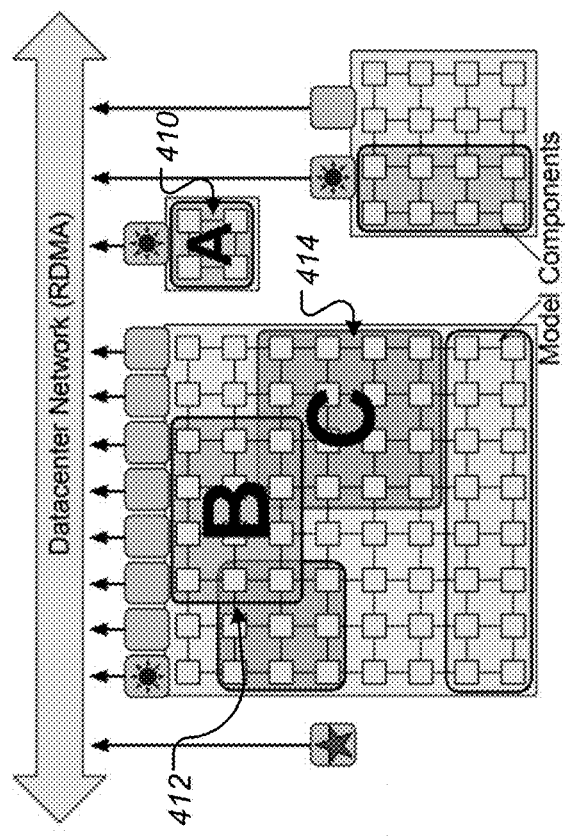
FIG. 4B is an example illustration of assigning a machine learning workload to a plurality of accelerator islands.
Figure 4A:
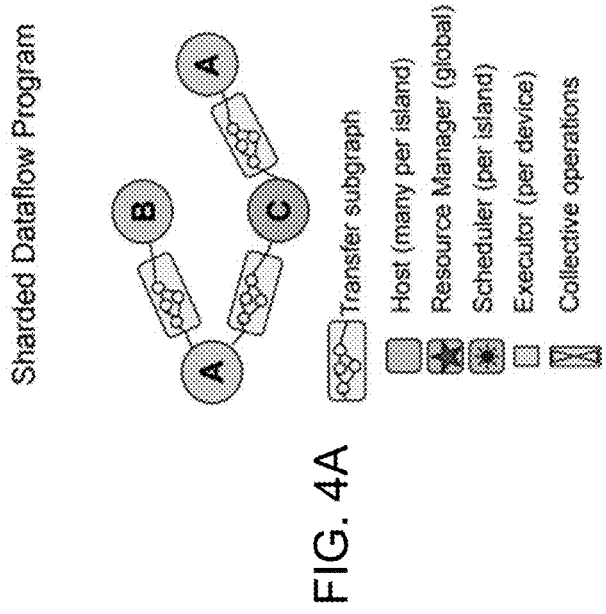
FIG. 4A is an example illustration of a sharded dataflow program.

FIG. 4A is an example illustration of a sharded dataflow program. As illustrated, a sharded dataflow program can be represented as a dataflow graph, which may for example be a directed acyclic graph, where each node represents a computation shard, e.g., an individual compiled function, and edges between nodes represent data flows between the computation shards, e.g., between the compiled functions. Each computation shard can be represented by a single node in the dataflow graph. For example, the machine learning workload represented by the sharded dataflow program illustrated in FIG. 4A includes three computation shards A, B, and C, each of which can be a respective compiled function.

In response to receiving the data representing the machine learning workload, the system assigns a respective portion of the machine learning workload to each of the plurality of accelerator islands for scheduling by the respective scheduler for the accelerator island (step 304). Specifically, one or more computation shards of the sharded dataflow program representing the machine learning workload can be assigned to each of the plurality of accelerator islands.

FIG. 4B is an example illustration of assigning a machine learning workload to a plurality of accelerator islands. As illustrated, the system uses a resource manager to allocate a portion of the available compute resources, namely a subset of hardware accelerators of the system, for each constituent computation shard for the machine learning workload. The resource manager can determine the allocation by using any appropriate load balancing algorithms or techniques to load balance the hardware accelerators of the system.

In the example of FIG. 4B, the system assigns computation shard A to a first accelerator island 410, computation shard B to a second accelerator island 412, and computation shard C to a third accelerator island 414. In the cases where model parallelism is used in executing machine learning workload, each hardware accelerator may store a respective portion of the architecture of the data ("Model Components") that defines the architecture of a corresponding part of the neural network.

Figure 4C:
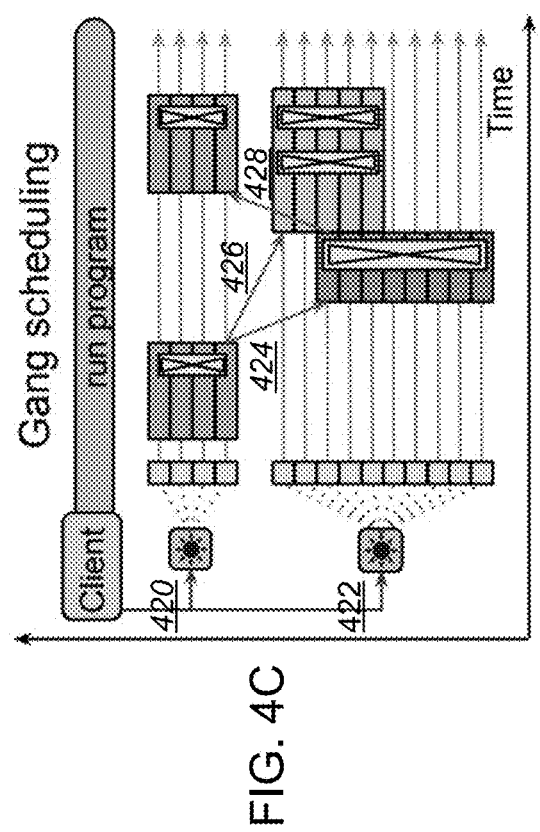
FIG. 4C is an example illustration of scheduling the assigned computations by a scheduler.

FIG. 4C is an example illustration of scheduling the assigned computations by a scheduler. Each accelerator island runs a respective scheduler that schedules the computations assigned to the island across the accelerators and hosts in the island. This configuration can support gang-scheduling of accelerator computations for concurrent execution of machine learning workloads while avoiding deadlocks. As illustrated, the scheduler for each island gang-schedules the assigned computations to the hosts within the island that are subsequently dispatched by (the executors instantiated on) the hosts to the hardware accelerators within the island for execution. In FIG. 4C, arrows 420 and 422 indicate control messages, and arrows 424, 426, and 428 show data-path transfers. Gang-scheduling is a type of co-scheduling where there are a group of computations, such that all the computations in the group including heterogeneous computations are simultaneously scheduled on different hardware accelerators, allowing them to make progress in parallel as a group.

In cases where the respective portion of the machine learning workload assigned to the accelerator island is a regular computation, e.g., a regular compiled function whose resource requirements are known, the scheduler for the accelerator island can schedule the portion of the computation using parallel asynchronous dispatch. In these cases, the system can assign the respective portion of the machine learning workload by sending a single message to the respective scheduler for the accelerator island, where the single message describes a subgraph of a computation graph that corresponds to the respective portion of the machine learning workload. The scheduler is configured to sequence the execution of all the active computation shards in the subgraph back to back. The use of a single message minimizes network traffic, but does not require the scheduler to actually enqueue all the computations shards in a subgraph as a batch, as computations may still be interleaved with those submitted by other concurrently executing programs.

Figure 5:
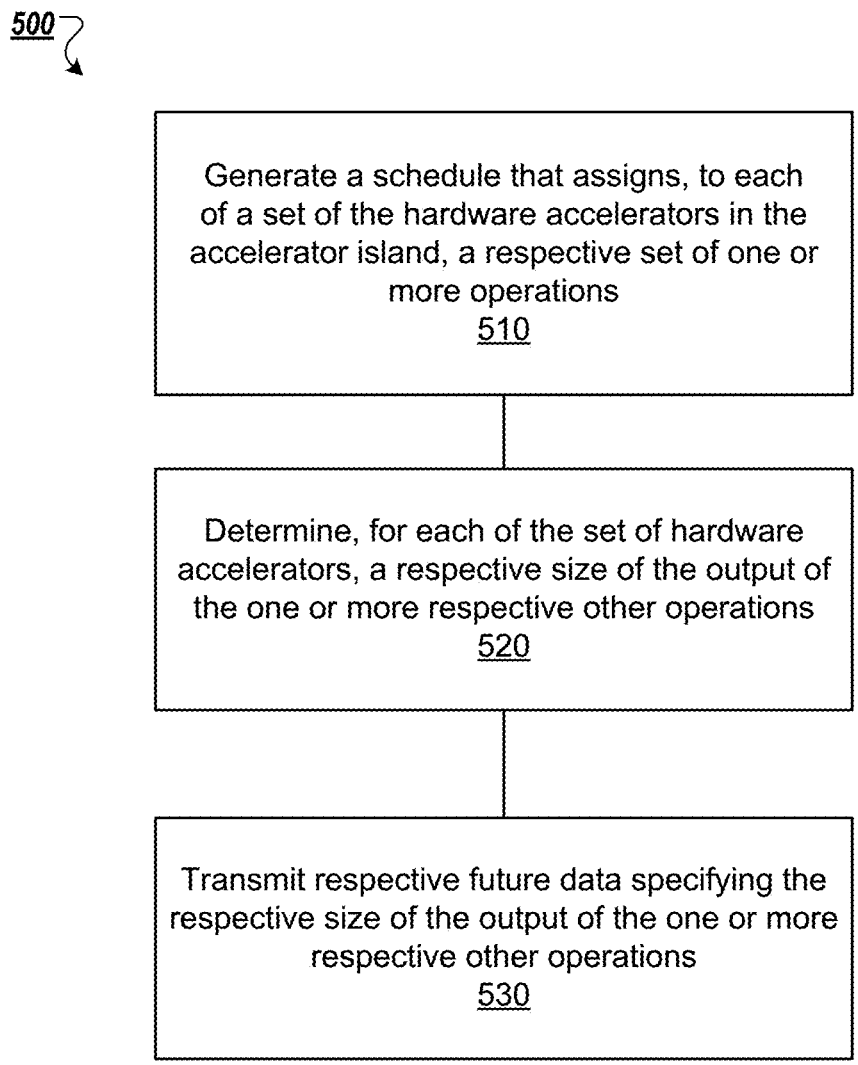
FIG. 5 is a flow diagram of an example process for scheduling a portion of the computation using parallel asynchronous dispatch.

FIG. 5 is a flow diagram of an example process 500 for scheduling a portion of the computation using parallel asynchronous dispatch. For convenience, the process 500 will be described as being performed by a system of one or more computers located in one or more locations. For example, a distributed computing system, e.g., the system 100 of FIG. 1, appropriately programmed in accordance with this specification, can perform the process 500.

The system generates a schedule that assigns, to each of a set of the hardware accelerators in the accelerator island, a respective set of one or more operations that takes as input and output of one or more respective other operations that are performed by another one of the hardware accelerators in the accelerator island (step 502). The one or more operations can be the computations for executing the respective portion of the machine learning workload assigned to each accelerator island. For example, the one or more operations can be the constituent operations of a compiled function.

The system determines, for each of the set of hardware accelerators, a respective size of the output of the one or more respective other operations (step 504).

The system transmits, in parallel and to the corresponding host for each of the set of hardware accelerators, respective future data specifying the respective size of the output of the one or more respective other operations (step 506).

The respective future data causes the corresponding host for each of the set of hardware accelerators to (i) allocate memory on the hardware accelerator for storing the output of the one or more respective other operations and (ii) transmit data to a corresponding host of the accelerator assigned to the one or more respective other operations that identifies the allocated memory.

The corresponding host of the accelerator assigned to the one or more respective other operations is also configured to cause the accelerator assigned to the one or more respective other operations to transmit, over the interconnect network, the output of the respective other operations to the allocated memory.

Figure 6:
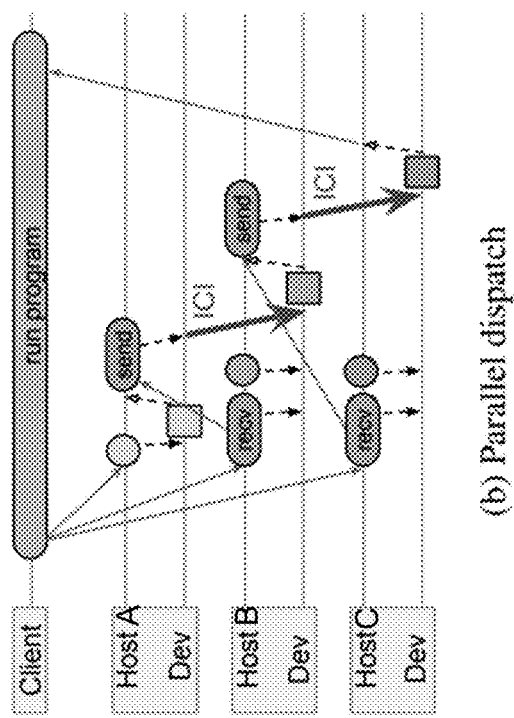
FIG. 6 illustrates a comparison between sequential and parallel dispatch for an example sharded dataflow program.
Figure 6:
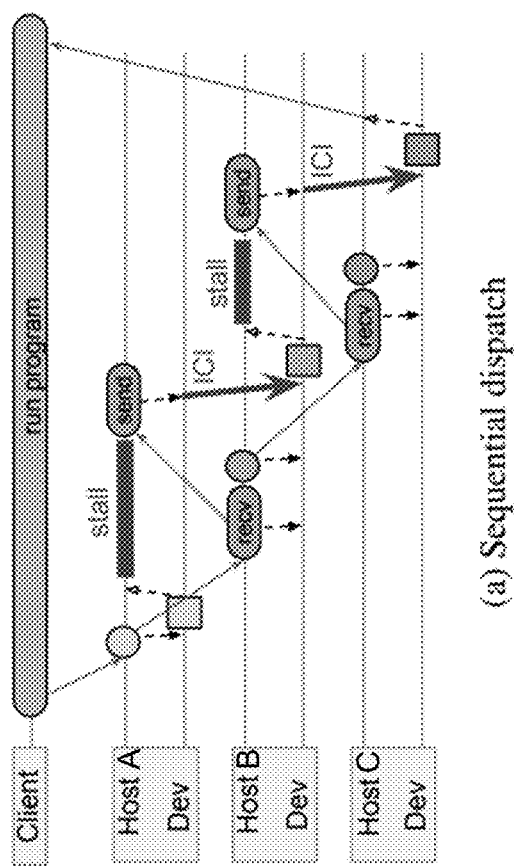

FIG. 6 illustrates a comparison between sequential and parallel dispatch for an example sharded dataflow program. In FIG. 6, the example sharded dataflow program is represented by a dataflow graph that includes three nodes A, B, and C (illustrated as circles) that each corresponds to a respective computation shard. Each computation shard is a regular compiled function. The computation shard that correspond to the three nodes A, B, and C are scheduled for execution (illustrated as squares) on accelerators ("Dev") connected to hosts ("Host") A, B, and C.

As illustrated on the left hand side of FIG. 6, in the case of sequential dispatch, host A enqueues computation shard A, receives future data specifying the size of the output for computation shard A, and transmits the future data to host B. Host B allocate memory on the hardware accelerator for storing the inputs of computation shard B, transmits the input buffer addresses to host A, and performs some of the preparatory work to launch computation shard B's function. When computation shard A completes, its outputs are sent through the interconnect network directly into computation shard B's input buffers, and then host B starts computation shard B. The latency between one computation shard completing and the next computation shard starting can be made to be little more than the data transfer time.

While this usually works well when a predecessor node's computation takes a decent amount of time, in the cases shown in the FIG. 6 where the computation time is shorter than the time spent in scheduling, resource allocation, and coordination between hosts, the asynchronous pipeline stalls (because of host-side work in sequential dispatch) and the host-side work becomes the critical bottleneck for executing the overall sequence of computations.

The system therefore uses parallel asynchronous dispatch, as illustrated on the right hand side of FIG. 6, to overcome this bottleneck in traditional sequential dispatch by running the host-side work in parallel.

In particular, given that the compiled functions are all regular, the size of a successor node's input data can in practice be precomputed, i.e., computed before the predecessor computation was even enqueued. The parallel asynchronous dispatch mechanism exploits the statically known resource usage of regular compiled functions to run most of the host-side work for a computation's nodes in parallel, rather than serializing the work for a node to happen after its predecessors have been enqueued.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, specialpurpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are correspond toed in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes correspond toed in the accompanying figures do not necessarily require the particular order shown, or sequential order, to achieve desirable results. In some cases, multitasking and parallel processing may be advantageous.

What is claimed is:

1. A system comprising:
    a plurality of accelerator islands, each accelerator island comprising a respective plurality of hardware devices that include a plurality of hardware accelerators and a corresponding host for each of the plurality of hardware accelerators; and
    a respective scheduler for each of the accelerator islands that is configured to schedule workloads across the plurality of accelerators and corresponding hosts in the accelerator island, wherein the system is configured to:
        receive data representing a machine learning workload; and
        assign a respective portion of the machine learning workload to each of the plurality of accelerator islands for scheduling by the respective scheduler for the accelerator island, comprising assigning the respective portion of the machine learning workload to each of the plurality of accelerator islands by sending a single message to the respective scheduler for the accelerator island when the respective portion of the machine learning workload is a regular computation.

2. The system of claim 1, wherein the data representing the machine learning workload is data representing a sharded dataflow program comprising a plurality of shards.

3. The system of claim 2, wherein assigning the respective portion of the machine learning workload to each of the plurality of accelerator islands comprises assigning one or more shards of the sharded dataflow program to each of the plurality of accelerator islands.

4. The system of claim 1, wherein each scheduler is configured to, when the respective portion of the machine learning workload assigned to the accelerator island is a regular computation, schedule the portion of the computation using parallel asynchronous dispatch.

5. The system of claim 4, wherein scheduling the portion of the computation using parallel asynchronous dispatch comprises:
    generating a schedule that assigns, to each of a set of the hardware accelerators in the accelerator island, a respective set of one or more operations that takes as input and output of one or more respective other operations that are performed by another one of the hardware accelerators in the accelerator island;
    determining, for each of the set of hardware accelerators, a respective size of the output of the one or more respective other operations; and
    transmitting, in parallel and to the corresponding host for each of the set of hardware accelerators, respective future data specifying the respective size of the output of the one or more respective other operations.

6. The system of claim 5, wherein the respective future data causes the corresponding host to (i) allocate memory on the hardware accelerator for storing the output of the one or more respective other operations and (ii) transmit data to a corresponding host of the accelerator assigned to the one or more respective other operations that identifies the allocated memory.

7. The system of claim 6, wherein the corresponding host of the accelerator assigned to the one or more respective other operations is configured to cause the accelerator assigned to the one or more respective other operations to transmit the output of the respective other operations to the allocated memory.

8. The system of claim 7, wherein the output is transmitted over an accelerator interconnect network.

9. One or more computer-readable storage media storing instructions that when executed by one or more computers cause the one or more computers to perform the operations comprising:
    receiving data representing a machine learning workload by a plurality of accelerator islands, wherein each accelerator island comprises a respective plurality of hardware devices that include a plurality of hardware accelerators and a corresponding host for each of the plurality of hardware accelerators, and wherein each accelerator island has a respective scheduler that is configured to schedule workloads across the plurality of accelerators and corresponding hosts in the accelerator island; and
    assigning a respective portion of the machine learning workload to each of the plurality of accelerator islands for scheduling by the respective scheduler for the accelerator island, comprising assigning the respective portion of the machine learning workload to each of the plurality of accelerator islands by sending a single message to the respective scheduler for the accelerator island when the respective portion of the machine learning workload is a regular computation.

10. The computer-readable storage media of claim 9, wherein each scheduler is configured to, when the respective portion of the machine learning workload assigned to the accelerator island is a regular computation, schedule the portion of the computation using parallel asynchronous dispatch.

11. A method comprising:
    receiving data representing a machine learning workload by a plurality of accelerator islands, wherein each accelerator island comprises a respective plurality of hardware devices that include a plurality of hardware accelerators and a corresponding host for each of the plurality of hardware accelerators, and wherein each accelerator island has a respective scheduler that is configured to schedule workloads across the plurality of accelerators and corresponding hosts in the accelerator island; and
    assigning a respective portion of the machine learning workload to each of the plurality of accelerator islands for scheduling by the respective scheduler for the accelerator island, comprising assigning the respective portion of the machine learning workload to each of the plurality of accelerator islands by sending a single message to the respective scheduler for the accelerator island when the respective portion of the machine learning workload is a regular computation.

12. The method of claim 11, wherein the data representing the machine learning workload is data representing a sharded dataflow program comprising a plurality of shards.

13. The method of claim 12, wherein assigning the respective portion of the machine learning workload to each of the plurality of accelerator islands comprises assigning one or more shards of the sharded dataflow program to each of the plurality of accelerator islands.

14. The method of claim 11, wherein each scheduler is configured to, when the respective portion of the machine learning workload assigned to the accelerator island is a regular computation, schedule the portion of the computation using parallel asynchronous dispatch.

15. The method of claim 14, wherein scheduling the portion of the computation using parallel asynchronous dispatch comprises:
generating a schedule that assigns, to each of a set of the hardware accelerators in the accelerator island, a respective set of one or more operations that takes as input and output of one or more respective other operations that are performed by another one of the hardware accelerators in the accelerator island;
determining, for each of the set of hardware accelerators, a respective size of the output of the one or more respective other operations; and
transmitting, in parallel and to the corresponding host for each of the set of hardware accelerators, respective future data specifying the respective size of the output of the one or more respective other operations.

16. The method of claim 15, wherein the respective future data causes the corresponding host to (i) allocate memory on the hardware accelerator for storing the output of the one or more respective other operations and (ii) transmit data to a corresponding host of the accelerator assigned to the one or more respective other operations that identifies the allocated memory.

17. The method of claim 16, wherein the corresponding host of the accelerator assigned to the one or more respective other operations is configured to cause the accelerator assigned to the one or more respective other operations to transmit the output of the respective other operations to the allocated memory.

18. The method of claim 17, wherein the output is transmitted over an accelerator interconnect network.

* * * * *